G. N. BRUNKER.
DIRIGIBLE HEADLIGHT.
APPLICATION FILED AUG. 25, 1917.
1,268,675.
Patented June 4, 1918.
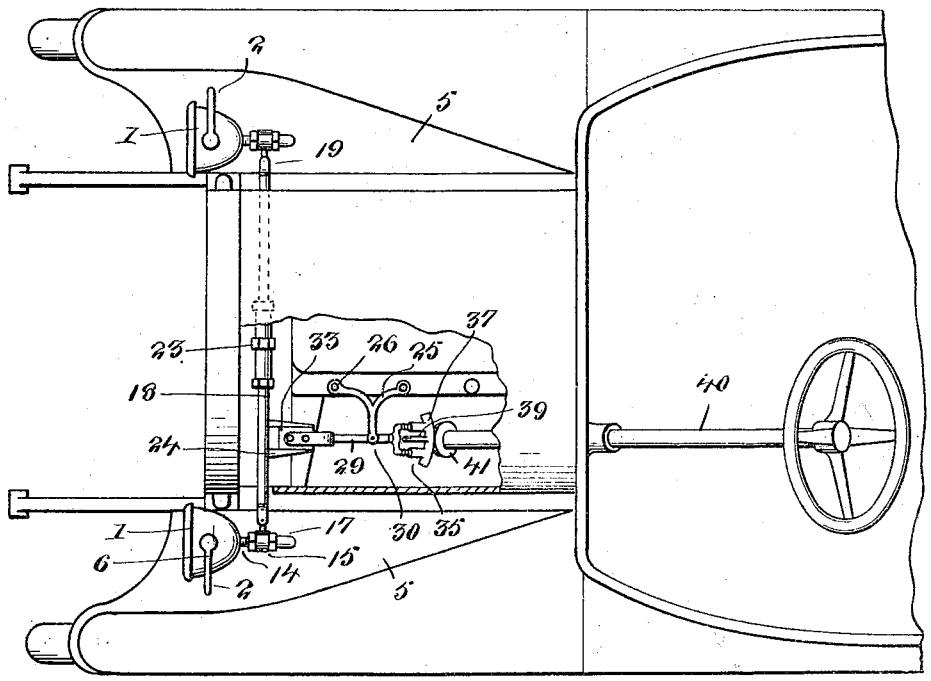
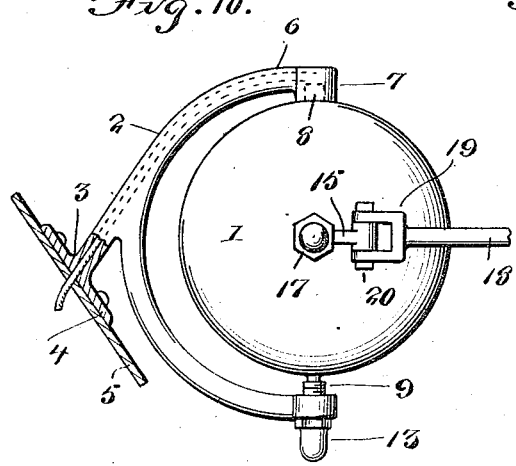
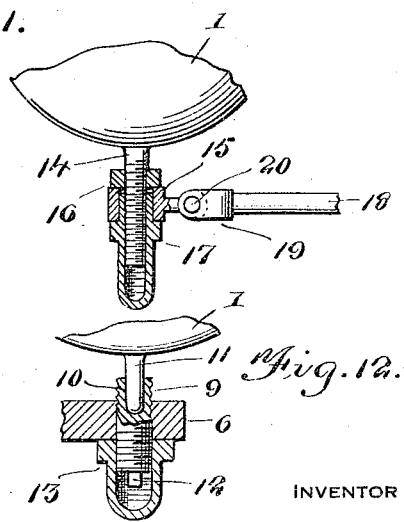
INVENTOR
G. N. Brunker
BY Victor J. Evans
ATTORNEY
WITNESSES

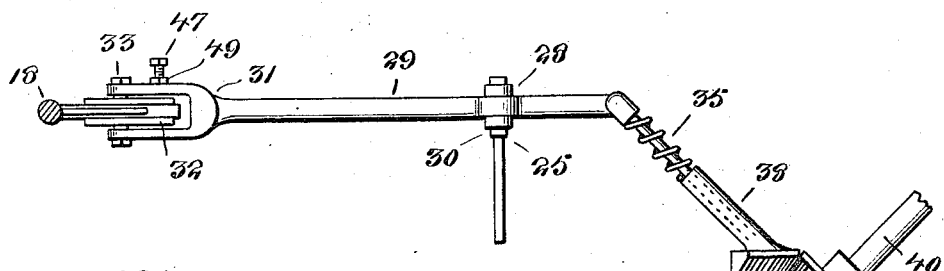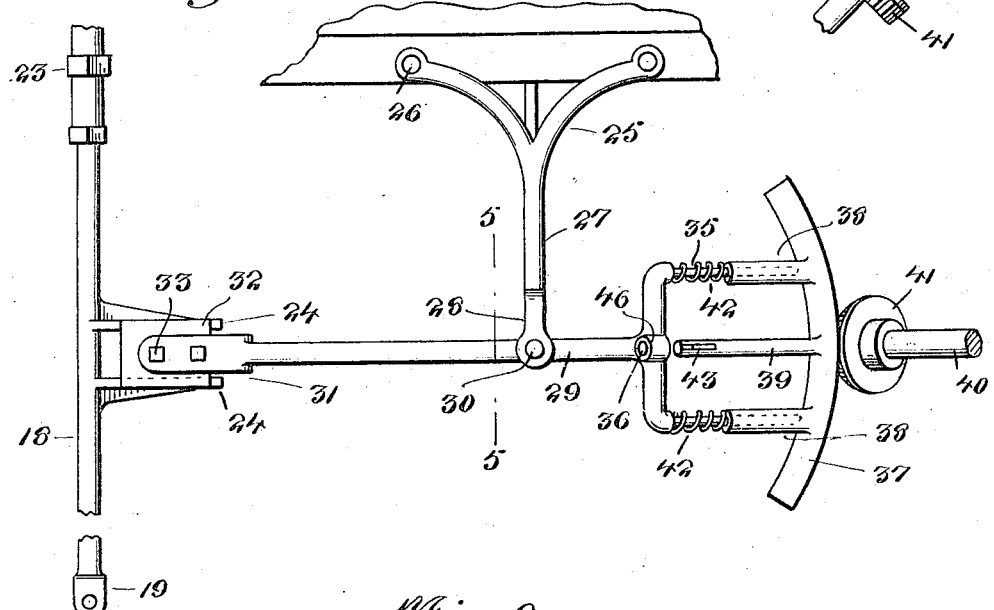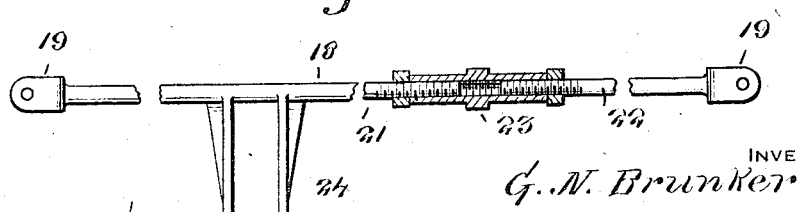

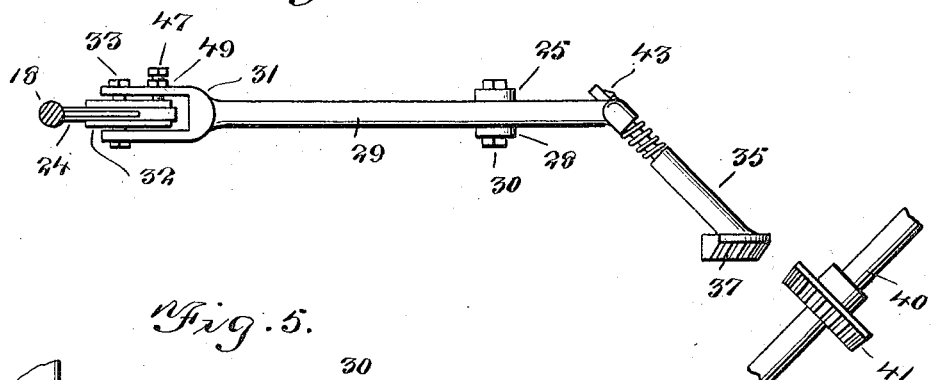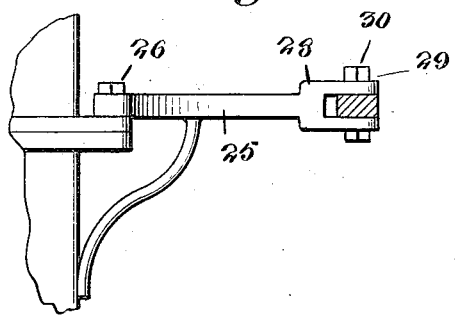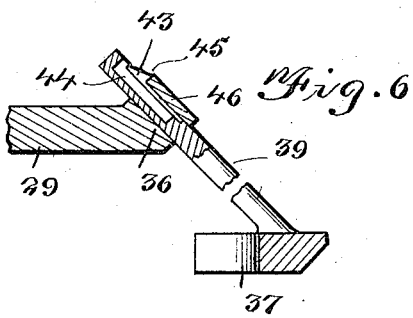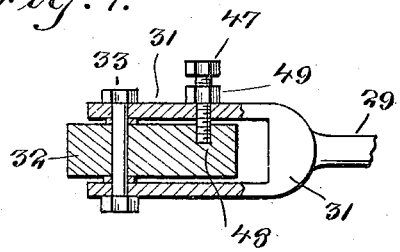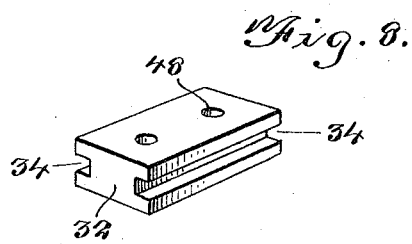

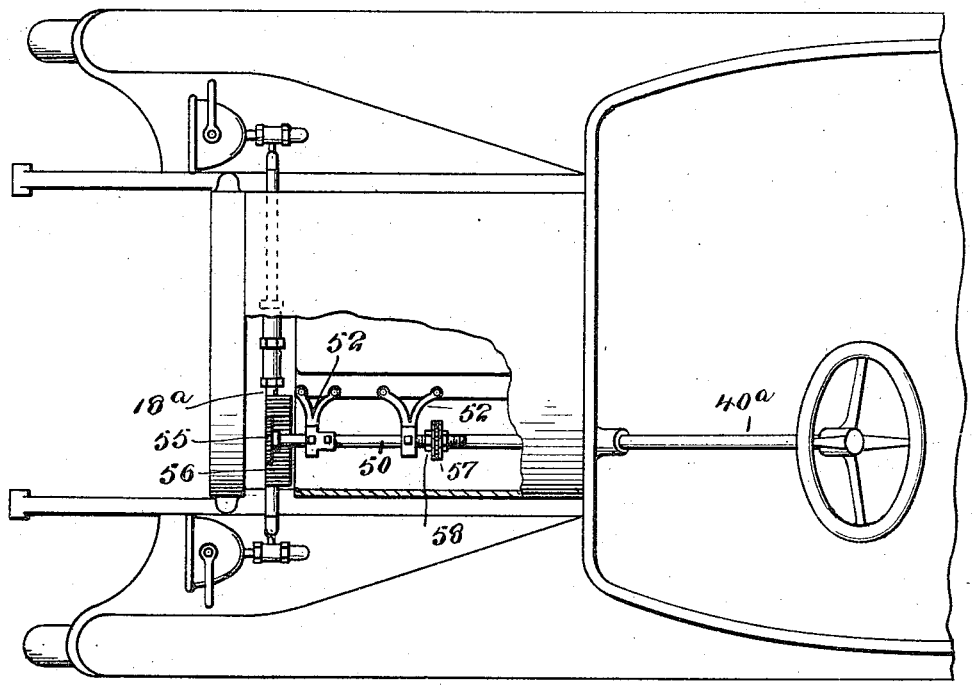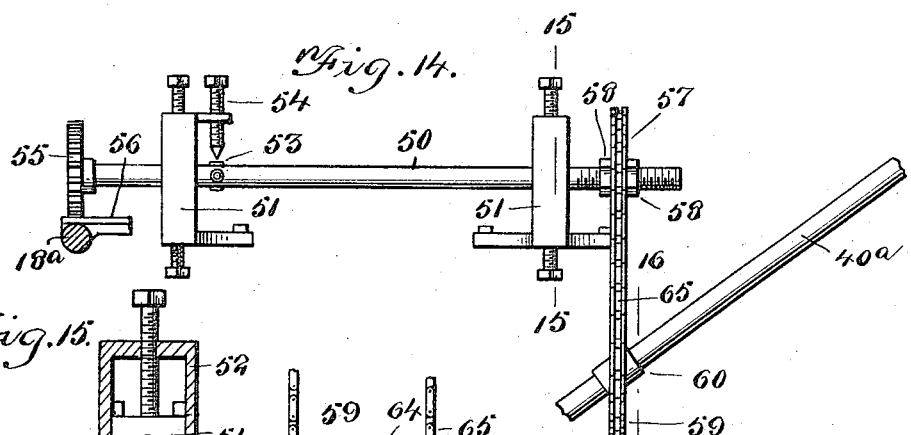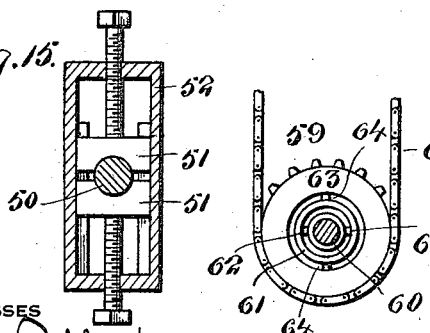

UNITED STATES PATENT OFFICE.

GEORGE N. BRUNKER, OF POCATELLO, IDAHO.

DIRIGIBLE HEADLIGHT.

1,268,675.  Specification of Letters Patent.  Patented June 4, 1918.

Application filed August 25, 1917. Serial No. 188,152.

*To all whom it may concern:*

Be it known that I, GEORGE N. BRUNKER, a citizen of the United States, residing at Pocatello, in the county of Bannock and State of Idaho, have invented new and useful Improvements in Dirigible Headlights, of which the following is a specification.

This invention relates to improvements in dirigible headlights for automobiles and other vehicles, the object of the invention being to provide improved devices of this class, arranged for operation by the steering post of an automobile and by means of which the lamps are turned automatically in time with the front wheels and independently of the body of the vehicle so that the rays of light will always be reflected in the direction of movement of the front wheels and thereby cause the road in front of the machine to be properly lighted, even in rounding curves, and to also notify pedestrians and others of the intended direction of movement of the machine and thereby enable accidents to be avoided.

A further object of the invention is to provide improved headlight operating means of this character which when desired can be disconnected from the steering post and arranged to hold the headlights rigid and in a position to reflect the rays of light directly ahead.

The invention consists in the construction, combination and arrangement of devices hereinafter described and claimed.

In the accompanying drawings:—

Figure 1 is a plan, partly in section, of the front portion of an automobile and showing the same provided with a headlight controlling mechanism constructed and arranged in accordance with my invention.

Fig. 2 is a detailed sectional elevation, partly in section, of the headlight controlling mechanism.

Fig. 3 is a detailed plan of the same.

Fig. 4 is a detailed elevation of the same, partly in section, showing the same disconnected from the steering post.

Fig. 5 is a detailed sectional view on the plane indicated by the line 5—5 of Fig. 3.

Fig. 6 is a detailed sectional view of the lever and segment gear, showing the latter in disengaged position.

Fig. 7 is a detailed sectional view of the lever and slide block.

Fig. 8 is a detailed perspective view of the slide block.

Fig. 9 is a detailed plan, partly in section, of the connecting rod between the lamps or headlights.

Fig. 10 is a detailed rear elevation, of one of the headlights and its connections and showing the standard of the same and a portion of a mud guard in section.

Fig. 11 is a detailed plan of the same, partly in section.

Fig. 12 is a detailed vertical sectional view, showing the lower bearing of one of the headlights.

Fig. 13 is a plan, partly in section of a modified form of my invention.

Fig. 14 is a detailed elevation of the same.

Figs. 15 and 16 are detailed views of the same.

The headlights or lamps 1 are pivotally mounted in brackets 2, the standards 3 of which brackets have their bases 4 secured on the mud guards 5 of an automobile. Each bracket has a semi-circular arm 6 provided at the upper end with a socket bearing 7 for the reception of a pivot 8 on the upper side of the lamp. The lower end of each semi-circular arm is provided with a vertical threaded opening which receives a vertical threaded member 9 which has a thrust bearing 10 in its upper side for the lower pivot 11 of the lamp. At its lower end the threaded bearing member 9 is provided with a polygonal portion 12 to be engaged by a wrench to enable the bearing member to be turned to adjust the same as may be required. A cap nut 13 is screwed to the lower portion of the threaded bearing member and bears against the under side of the curved bracket arm 6 as shown in Fig. 12. This construction of the brackets and of the headlights causes the headlights to be pivotally mounted so that they may be turned in any desired direction, and also enables the bearings of the headlights to be adjusted as may be required from time to time to take up wear.

Each headlight or lamp is provided at its rear side with a centrally arranged horizontally extending threaded arm 14. A knuckle 15 is secured on each arm 14 by and between a nut 16 and a cap nut 17 as shown in Fig. 11. A connecting rod 18 has forked ends 19 which are pivotally connected to the knuckles as at 20. Thereby the headlights are connected together by simultaneous pivotal movement to enable the headlights to be turned simultaneously. The connecting rod comprises members 21, 22 which are adjustably connected together by a turn-buckle 23 so that the connecting rod may be longitudinally adjusted as may be required. The member 21 of the connecting rod has a pair of spaced guide arms 24 which extend rearwardly therefrom.

A bracket 25 is provided which is secured on the base of the motor as at 26. Said bracket has a horizontally arranged transversely extending arm 27 the outer end of which is bifurcated as at 28. A lever 29 is pivotally mounted in the bifurcated end of the bracket arm as at 30 and has a forked front end 31 in which a slide block 32 is pivotally mounted as by means of a bolt 33. The said slide block has longitudinal guide grooves 34 in its sides in which the arms 24 of the connecting rod engage so that the said block is mounted for sliding movement on and between said arms, as will be understood.

The lever 29 is provided at the rear end with a pair of downwardly and rearwardly inclined fork arms 35 and is also provided at a point intermediate the fork arms with an inclined guide opening 36. A beveled segment 37 is provided with inclined tubular guide arms 38 which receive the fork arms 35 of the lever and said segment is also provided with an inclined guide and locking arm 39 which operates in the guide opening 36. The steering shaft 40 of the automobile is provided with a beveled pinion 41 to engage the segment 37. The arms 35 are provided with coiled extensile springs 42 which normally hold the segment gear 37 in engagement with the pinion. When the steering shaft is turned to guide the machine the gears 41, 37 turn the lever 29 and cause said lever, which is connected to the rod 18 by the members 24, 32 to move said rod endwise and thereby turn the headlights in the same direction as the front wheels, so that the rays of light are reflected ahead of the machine in the same direction as the front wheels, thus lighting up the road ahead of the machine and also enabling pedestrians and others to note the direction in which the machine is to be turned.

In order to enable the headlight controlling mechanism to be disconnected from the steering shaft and to remain in fixed position with the headlights arranged to reflect their rays straight ahead of and in line with the body of the vehicle I provide a spring detent 43 which is attached to the arm 39 of the gear 37, is arranged in a recess 44 with which said arm 39 is provided and has a shoulder 45 which is adapted to engage the upper side of that portion 46 of the lever in which the guide opening 36 is provided, when the segment gear 37 is moved out of engagement with the gear 41, said spring detent thus holding the segment 37 in such disengaged position. I also provide a set screw 47 which engages a threaded opening in the upper arm 31 of the lever and is adapted to be engaged in a recess 48 of the block 32 to lock the lever to said block against pivotal movement and thereby prevent longitudinal movement of the connecting rod and hence hold the headlights rigid and cause them to reflect their rays directly ahead of and in line with the body of the machine. The set screw is provided also with a lock nut 49.

In Figs. 13 and 14 I show a modified construction of my invention which may be installed in automobiles of a certain type in which there is not sufficient room for the installation of the lever 29 and its connections. An intermediate shaft 50 is mounted in bearings 51 which are adjustable vertically in brackets 52 secured on the base of the motor. Said shaft has radial sockets 53 and one of the brackets 51 has a set screw 54 which may be engaged with any one of the sockets to prevent rotation of said shaft when it is not desired that the same shall operate. Normally, however, the said screw is disengaged from the shaft as shown in Fig. 14. At the front end of the shaft is a pinion 55 which engages a rack 56 with which the connecting rod 18ª is provided. A sprocket wheel 57 is secured adjustably on the rear portion of said shaft and is held in any desired adjusted position by nuts 58 which are screwed on the shaft as shown. A sprocket wheel 59 is secured to the steering shaft 40ª and comprises a hub member 60, an intermediate annular member 61 which is pivotally mounted on the hub member as at 62 and an outer member 63 which is pivotally mounted on the intermediate member as at 64, the pivotal axis 64 being at right-angles to the pivotal axis 62 so that the said sprocket wheel is arranged for universal angular movement with respect to the steering shaft. An endless sprocket chain 65 connects the sprocket wheels 57, 59 and serves to transmit motion from the steering shaft to the intermediate shaft 50, the latter through the instrumentality of the pinion 55 and rack 56 being arranged to operate the connecting rod and hence the headlights, as will be understood.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In combination with the steering shaft of an automobile and pivotally mounted headlights, a connecting rod between the headlights to cause them to turn in unison, a lever provided with a segment gear at one end and having the opposite end directly connected to said connecting rod, and a pinion on the steering shaft for engagement by said segment gear.

2. In combination with the steering shaft of an automobile and pivotally mounted headlights, a connecting rod between the headlights to cause them to turn in unison, a lever provided with a segment gear at one end and having the opposite end directly connected to said connecting rod, and a pinion on the steering shaft for engagement by said segment gear, said segment gear being mounted on said lever for movement independently of said lever and toward and from the pinion for engagement therewith and disengagement therefrom, and means to secure said segment gear when the same is in disengaged position.

3. In combination with pivotally mounted headlights and with the steering shaft of an automobile, a rod connecting the headlights for simultaneous turning movement, said rod being provided with guide arms, a block slidably mounted on said guide arms, a bracket for attachment to a fixed part of the automobile, a lever pivotally mounted in said bracket and pivotally connected at the front end to said block, a segment gear at the rear end of said lever and a pinion on the steering shaft and engaged by said segment gear.

4. In combination with the steering shaft of an automobile and pivotally mounted headlights, a connecting rod between the headlights to cause them to turn in unison, a lever having one end directly connected to said connecting rod, a segment gear, said segment gear and said lever having arms connecting said segment gear to said lever for movement of said segment gear relative to said lever, and a pinion on the steering shaft for engagement and disengagement by said segment gear, and means to secure said segment gear when the same is in disengaged position.

In testimony whereof I affix my signature.

GEORGE N. BRUNKER.

Copies of this patent may be obtained for five cents each, by addressing the "Commissioner of Patents, Washington, D. C."